United States Patent
Paik et al.

(10) Patent No.: US 6,263,011 B1
(45) Date of Patent: Jul. 17, 2001

(54) RECEIVER FOR SPREAD SPECTRUM COMMUNICATION SYSTEM CAPABLE OF SHORTENING ACQUISITION TIME

(75) Inventors: Seung-Kwan Paik; Pil-Ho Kim; Chae-Hag Yi, all of Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/104,638

(22) Filed: Jun. 25, 1998

(30) Foreign Application Priority Data

Nov. 18, 1997 (KR) .................................. 97-60887

(51) Int. Cl.$^7$ ................. H04L 27/30; H04J 3/06
(52) U.S. Cl. ................ 375/149; 375/150; 370/515
(58) Field of Search .................... 375/130, 140, 375/141, 142, 145, 147, 149, 150, 343, 367; 370/320, 335, 342, 441, 465, 501, 503, 509, 515

(56) References Cited

U.S. PATENT DOCUMENTS 5,956,367 * 9/1999 Koo et al. .................. 375/206
5,987,059 * 11/1999 Harrison et al. ............ 375/208

* cited by examiner

Primary Examiner—Stephen Chin
Assistant Examiner—Betsy L. Deppe
(74) Attorney, Agent, or Firm—F. Chau & Associates, LLP

(57) ABSTRACT

A receiver is provided for use in a spread spectrum communication system for receiving a spread spectrum signal having a modulated PN code, the receiver including: an analog-to-digital converter for sampling an input signal in synchronization with a first clock signal, and generating a sampled signal. The first clock signal having n times a frequency of a chip clock signal. Also included is a counter for a counting a number of clocks of the first clock signal to generate a selection signal; a pseudonoise code generator for generating a substantially replica pseudonoise code signal in synchronization with a second clock signal having the frequency of the chip clock signal; a memory for storing the sampled signal in synchronization with the second clock signal; a selector for selecting one of the sampled signals stored in the memory in response to the selection signal; a demodulator for demodulating the pseudonoise code signal from the sampled signal; an accumulator for accumulating outputs of the demodulator during a cycle of the second clock signal to generate an accumulated acquisition value; and a comparator for comparing the accumulated acquisition value with a threshold value, generating an acquisition success signal if the accumulated acquisition value is greater than the threshold, and generating a hold signal if the accumulated acquisition value is less than the threshold,

14 Claims, 2 Drawing Sheets

RECEIVER FOR SPREAD SPECTRUM COMMUNICATION SYSTEM CAPABLE OF SHORTENING ACQUISITION TIME

FIELD OF THE INVENTION

The present invention relates generally to a direct sequence spread spectrum receiver (DSSS); particularly a receiver capable of shortening acquisition time.

BACKGROUND OF THE INVENTION

Commercial interest in DSSS communication systems has recently risen due to their potential in providing services to more users than is offered by other multiple access systems. In a cell site station of a DS/CDMA system, a data symbol is spread by multiplying it with higher frequency orthogonal pseudo-random number sequences assigned to the cell site.

The primary function of pseudo-random noise (PN) code synchronization in spread spectrum communication systems, such as the Code Division Multiple Access Direct Sequence Spread Spectrum (CDMA-DSSS) system, is to despread the received PN code for demodulation of the received signal. The received signal in essence consists of two digital signals or bit streams that are combined to create a modulated third signal prior to transmission. The first digital signal is an information signal, such as from the output of a digitized voice circuit, which may have a bit rate, for example, of 10 kb/s. The second signal is generated by a random-sequence or pseudonoise (PN) generator and constitutes a stream of essentially random bits having a bit rate that is several orders of magnitude greater than that of the digitized voice signal. The combination or modulated third signal that is actually transmitted has the same bit rate as the faster second signal while containing the slower voice signal.

At the receiver, after carrier frequency demodulation, despreading is accomplished by generating a local replica of the PN code with a random-sequence generator in the receiver and then synchronizing the local PN signal to the one that has been superimposed on the incoming received signal. By removing the random sequence from the received signal and integrating it over a symbol period, a despread signal is obtained which ideally represents the recovered original 10 kb/s voice signal.

The process of signal synchronization is usually accomplished in two steps. The first step, called acquisition, consists of bringing the two codes or spreading signals into coarse time alignment within one code chip interval. The second step, called tracking, takes over and continuously maintains the best possible waveform alignment by means of a feedback loop. The focus of the present invention is on the acquisition aspect of signal synchronization.

Because of the importance of synchronization (or acquisition), many schemes have been proposed which utilized various types of detectors and decision strategies in different application areas. A common feature of most synchronization schemes is that the received signal and the locally generated signal are first correlated to produce a measure of similarity. The correlation result is compared to a threshold to decide if the two signals are in synchronism. If synchronization is detected, the tracking loop takes over. If there is no synchronization, the acquisition process continues. Typically, the phase of the locally generated PN code is changed and another correlation is attempted until the correlation result exceeds a certain threshold, signifying synchronization or acquisition.

As explained above, a DSSS communication system which restores phase is called a synchronization system. In such system, two methods of acquisition, serial or parallel, are generally used. The parallel acquisition method may have performance better than the serial acquisition method, but high performance hardware is needed due to the more complex functional requirements. For this and other reasons, serial acquisition techniques or systems are more widely used.

FIG. 1 is a block diagram showing a conventional synchronization spread spectrum system capable of implementing serial acquisition. In the system, a PN despreading operation is accomplished by multiplying a PN code signal with a form of an input Signal received from the receiver antenna. The PN code signal is output from PN code generator 12. The input Signal is converted to a digital signal by an analog-to-digital converter 10, which is sampled by clock signal CLK1 which corresponds to a chip clock signal. The digital data output from the analog-to-digital converter 10 is time-ordered with latch 11 and clocked by CLK 2. The output of multiplier 13 is accumulated by accumulator 14 the values is correlated and compared with a threshold value in comparator 17. If the correlation or accumulation value is greater than the threshold value, acquisition is accomplished. If the correlation value is less than the threshold value, the system holds the PN code signal generated from the PN code generator 12, and the synchronization and correlation process repeats for other phases of the input Signal until synchronization with the proper phase is achieved.

It can be seen that with the conventional serial acquisition method described above correlation may not be accomplished until after several attempts with different phases of the input signal. A need exists for a serial acquisition process corresponding to a chip clock cycle which is more time efficient.

SUMMARY OF THE INVENTION

The present invention provides a synchronization spread spectrum receiver capable of implementing a serial acquisition process and having a shortened time of acquisition.

According to an aspect of the present invention, a receiver is used in a spread spectrum communication system for receiving a spread spectrum signal having a modulated PN code, the receiver comprising: an analog-to-digital converter for sampling an input signal in synchronization with a first clock signal, and generating a sampled signal, said first clock signal having n times a frequency of a chip clock signal, where n is a positive integer; a counter for counting a number of clocks of the first clock signal to generate a selection signal; a pseudonoise code generator for generating a substantially replica pseudonoise code signal in synchronization with a second clock signal having the frequency of the chip clock signal; a memory for storing the sampled signal in synchronization with the second clock signal; a selector for selecting one of the sampled signals stored in the memory in response to the selection signal; a demodulator for demodulating said pseudonoise code signal from the sampled signal; an accumulator for accumulating outputs of the demodulator during a cycle of the second clock signal to generate an accumulated acquisition value; and a comparator for comparing the accumulated acquisition value with a threshold value, generating an acquisition success signal if the accumulated acquisition value is greater than the threshold value, and generating a hold signal if the accumulated acquisition value is less than the threshold value, wherein said pseudonoise code generator receives the hold signal from the comparator and delays a phase of the replica pseudonoise code signal.

Preferably, in the receiver, the demodulator comprises a multiplier for multiplying a signal selected by the selector with the substantially replica pseudonoise code signal. The memory preferably comprises a plurality of shift registers, each of which stores the sampled signal in synchronization with the second clock signal and delivers a signal stored therein to the selector.

The accumulator of the receiver according to the illustrative embodiment comprises a plurality of serial latches and an adder for adding the outputs of the demodulator to an output of the serial latches, and wherein an output of a latch at a first stage of the serial latches is provided to the comparator as the output of the accumulated acquisition value.

A receiver according to another illustrative embodiment of the present invention is used in a spread spectrum communication system for receiving a spread spectrum signal having a modulation code, the receiver comprising: a sampler for sampling the spread spectrum signal with a first clock at a clock rate of n times the rate of a chip to output a sampled signal; a register having n stages for storing said sampled signal, said register being clocked by a second clock signal at the rate of a chip; a selector for selecting which of said sampled signal stored in said register for outputting from a multiplexer, said selector being clocked by said first clock; a demodulation code generator for outputting a replica of said modulation code, at the rate of a chip; a demodulator for demodulating said modulation code from said output from said multiplexer by combining with said replica from said demodulation code generator; and an accumulator for accumulating said output of said demodulator and outputting an acquisition signal when an accumulation is greater than a threshold, said hold signal for causing a delay in outputting said replica modulation code.

With the use of the receivers according to the illustrative embodiments of the present invention, the acquisition time can be shortened by accomplishing correlation of a plurality of phases during a cycle of a chip clock signal.

BRIEF DESCRIPTION OF THE DRAWINGS

This invention may be understood and its objects will become apparent to those skilled in the art by reference to the accompanying drawings as follows.

DESCRIPTION OF PREFERRED EMBODIMENTS

Figure 1:
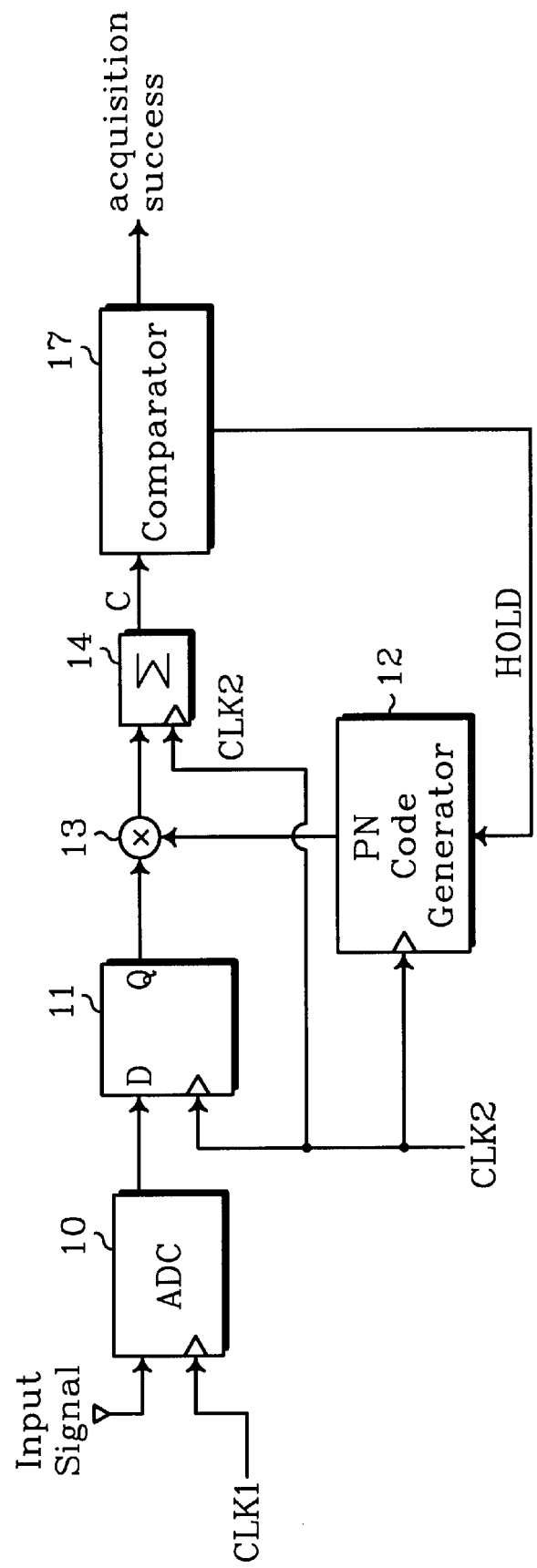
FIG. 1 is a circuit diagram showing a conventional receiver of a synchronization spread spectrum system capable of implementing a conventional serial acquisition method.
Figure 2:
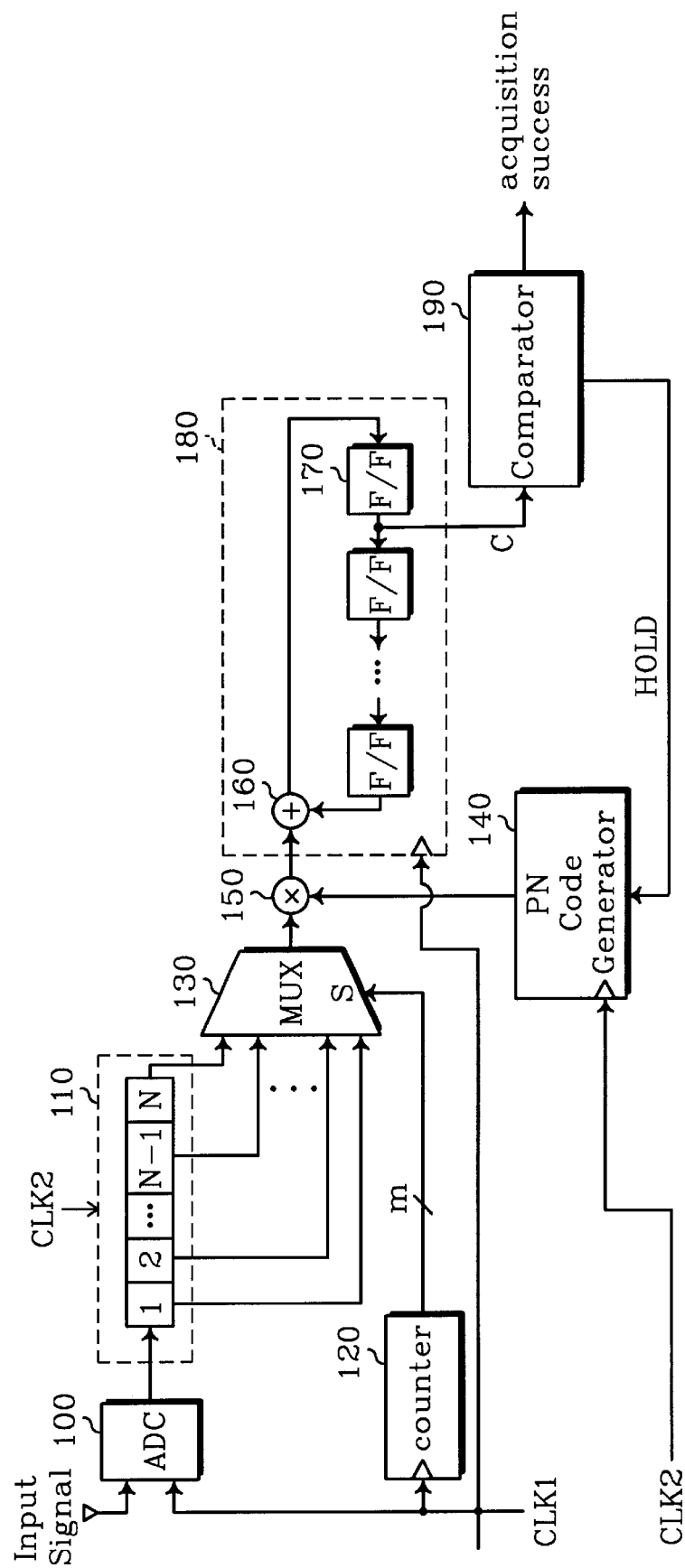
FIG. 2 is a circuit diagram showing a novel receiver useable in a synchronization spread spectrum system in which a serial acquisition method is implemented in accordance with the present invention.

Referring to FIG. 2, a novel receiver of a synchronization spread spectrum system in accordance with an embodiment of the present invention comprises an analog-to-digital converter 100, a memory 110 having a plurality of shift registers, a counter 120, a multiplexer 130, a PN code generator 140, a multiplier 150, an accumulator 180 having a series of latches 170, and a comparator 190.

The analog-to-digital converter 100 receives an input signal, which is sampled in synchronization with a first clock signal CKL1. This clock signal CLK1 has n-times the frequency of a chip clock signal, where n is a positive integer. The signals sampled thus are sequentially stored in the shift registers of the memory 110 in synchronization with a second clock signal CLK2. This clock signal CLK2 has the frequency of the chip clock signal.

For illustration, assuming that the first clock signal CLK1 is 4 MHz and the second clock signal CLK 2 is 1 MHz. The number of the shift registers in the memory 110 should be four. The analog-to-digital converter 100 generates four sampled signals in every cycle of the chip clock signal, and the four shift registers of the memory 110 store one sampled signal in every cycle of the chip clock signal. This is because of the 4 MHz to 1 MHZ relationship between CLK1 and CLK2.

The counter 120 operates in synchronization with the first clock signal CLK1 and counts the number of clocks. For example, the counter 120 generates a selection signal whenever four clocks of the first clock signal CLK1 are applied. The multiplexer 130 receives simultaneously the sampled signals from the shift registers of the memory 110 and selects one of the sampled signals in response to the selection signal. The number of bits of the selection signals is dependent on the number of the shift registers. For an example, if the number of the shift registers is four, the number of bits of the selection signals is two.

The multiplier 150 multiplies the output of the multiplexer 130 with a PN code signal, which is generated from the PN code generator 140 in synchronization with the second clock signal CLK2. The PN code generated should be substantially a replica of the PN code used at the transmitter (not shown) of the system to spread the signal to be transmitted. As a result, a PN code signal included in the sampled signal can be demodulated or eliminated by the multiplier 150. The techniques in generating a substantial replica PN code is well known and they are not discussed herein.

The multiplied signal from the multiplier 150 is provided to the accumulator 180 which is synchronized with the first clock signal CLK1. The accumulator 180 has a plurality of latches 170 arranged in series and an adder 160, and is provided to receive the signal from the multiplier 150 in every cycle of the first clock signal CLK1 and accumulate the signals during the cycle of the second clock signal CLK2. With this structure, the accumulator 180, the latch 170 at a first stage generates an accumulated correlation value C. As a result, acquisition procedure of n phases (for example, n is four) can be carried out during a period corresponding to the cycle of the chip clock signal. Therefore, the acquisition time of the receiver can be shortened as compared to that of the conventional receiver. The accumulated correlation value C is provided to the comparator 190.

The comparator 190 compares the correlation value C with a threshold value. If the correlation value is greater than the threshold value, the comparator 190 generates an acquisition success signal as a comparison result signal. If not, the comparator 190 generates a hold signal HOLD, which is provided to the PN code generator 140. The PN code generator 140 allows the phase of the PN code signal to be delayed by the cycle of the chip clock signal in response to the hold signal HOLD. The holding procedure of the PN code generator 140 is carried out in the same manner as that of the conventional PN code generator.

Advantageously, the illustrative receiver according to the present invention shortens the time necessary for acquisition by performing correlation of a plurality of phases of the comparison signals in a cycle of a chip clock signal.

The embodiments described herein are merely illustrative of the preferred embodiments and of the principles of the present invention. Various modifications may be made to the invention by those persons ordinarily skilled in the art, without departing from the true scope or spirit of the present invention. For example, the rate of CLK 1 other than 4 times the rate of CLK 2, e.g., at n=8 or 16 are contemplated for use with the present invention. In addition, many modifications may be made to adapt a particular situation to the teaching of the present invention without departing from the central scope thereof. Therefore, it is not intended that the present invention be limited to the particular embodiment disclosed as the best mode contemplated for carrying out the present invention, but rather that the present invention includes all embodiments falling within the scope of the appended claims.

What is claimed is:

1. A receiver in a spread spectrum communication system for receiving a spread spectrum signal having a modulated PN code, the receiver comprising:
   an analog-to-digital converter for sampling an input signal in synchronization with a first clock signal, and generating a sampled signal, said first clock signal having n times a frequency of a chip clock signal, where n is a positive integer;
   a counter for counting a number of clocks of the first clock signal to generate a selection signal;
   a pseudonoise code generator for generating a substantially replica pseudonoise code signal in synchronization with a second clock signal having the frequency of the chip clock signal;
   a memory for storing the sampled signals in synchronization with the second clock signal;
   a selector for selecting one of the sampled signals stored in the memory in response to the selection signal;
   a demodulator for demodulating a modulated pseudonoise code signal from the sampled signal;
   an accumulator for accumulating outputs of the demodulator during a cycle of the second clock signal to generate an accumulated acquisition value; and
   a comparator for comparing the accumulated acquisition value with a threshold value, generating an acquisition success signal if the accumulated acquisition value is greater than the threshold value, and generating a hold signal if the accumulated acquisition value is less than the threshold value,
   wherein said pseudonoise code generator receives the hold signal from the comparator and delays a phase of the substantially replica pseudonoise code signal by a cycle of the chip clock signal.

2. The receiver according to claim 1, wherein said demodulator comprises a multiplier for multiplying a signal, selected by the selector, with the substantially replica pseudonoise code signal.

3. The receiver according to claim 1, wherein said memory comprises a plurality of shift registers, each of which stores the sampled signal in synchronization with the second clock signal and delivers a signal stored therein to the selector.

4. The receiver according to claim 1, wherein said accumulator comprises a plurality of serial latches and an adder for adding the outputs of the demodulator to the output of the last of the serial latches, and wherein an output of a latch at the first stage of the serial latches is provided to the comparator as the accumulated acquisition value.

5. A receiver in a spread spectrum communication system for receiving a spread spectrum signal having a modulation code, the receiver comprising:
   a sampler for sampling the spread spectrum signal with a first clock at a clock rate of n times a rate of a chip to output a sampled signal;
   a shift register having n shift for storing said sampled signal, said shift register being clocked by a second clock signal at the rate of the chip;
   a selector for selecting which of said sampled signal stored in said shift register for outputting from a multiplexer, said selector being clocked by said first clock;
   a demodulation code generator for outputting a substantial replica of said modulation code, at the rate of the chip;
   a demodulator for demodulating said modulation code from said output from said multiplexer by combining said modulation code from said output from said multiplexer with said substantial replica from said demodulation code generator; and
   an accumulator for accumulating said output of said demodulator and outputting an acquisition signal when an accumulation value is greater than a threshold, and a hold signal when the accumulation value is less than said threshold, said hold signal for causing a delay in outputting said substantial replica modulation code.

6. The receiver according to claim 5, wherein said delay is by a phase within a cycle of a chip.

7. The receiver according to claim 5, wherein said modulation code is a pseudonoise code.

8. The receiver according to claim 5, wherein said selector outputs a selection signal in every n cycles of the first clock.

9. The receiver according to claim 5, wherein said demodulator is a multiplier.

10. A method for acquiring a spread spectrum signal having a modulation code, the steps comprising of:
    sampling the spread spectrum signal with a first clock at a clock rate of n times a rate of a chip to output a sampled signal;
    storing said sampled signal in n stages of a register, said register being clocked by a second clock signal at the rate of a chip;
    selecting in a selector which of said sampled signal stored in said register for outputting from a multiplexer, said selector being clocked by said first clock;
    outputting a substantial replica of said modulation code from a code generator at the rate of the chip;
    demodulating by a demodulator said modulation code from said output from said multiplexer by combining said modulation code from said output from said multiplexer with said substantial replica of said modulation code from said code generator; and
    accumulating said output of said demodulator and outputting an acquisition signal when an accumulation value is greater than a threshold, and a hold signal when the accumulation value is less than said threshold, said hold signal causing a delay in outputting said substantial replica of said modulation code.

11. The method according to claim 10, wherein said delay is by a phase within a cycle of a chip.

12. The method according to claim 10, wherein said modulation code is a pseudonoise code.

13. The method according to claim 10, wherein said selector outputs a selection signal in every n cycles of the first clock.

14. The method according to claim 10, wherein n is equal to 4.

* * * * *